US012610156B2

(12) United States Patent
Long et al.

(10) Patent No.: US 12,610,156 B2
(45) Date of Patent: Apr. 21, 2026

(54) IMAGE SENSOR WITH ON-CHIP EVENT-BASED VISION SENSOR (EVS) DENOISER

(71) Applicant: OMNIVISION TECHNOLOGIES, INC., Santa Clara, CA (US)

(72) Inventors: Yixuan Long, Singapore (SG); Bo Mu, San Jose, CA (US); Wenlei Yang, Shanghai (CN)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 99 days.

(21) Appl. No.: 18/825,371

(22) Filed: Sep. 5, 2024

(65) Prior Publication Data

US 2026/0067588 A1     Mar. 5, 2026

(51) Int. Cl.
| | |
|---|---|
| *H04N 25/47* | (2023.01) |
| *H04N 25/44* | (2023.01) |
| *H04N 25/60* | (2023.01) |
| *H04N 25/76* | (2023.01) |
| *H04N 25/773* | (2023.01) |
| *H04N 25/779* | (2023.01) |

(52) U.S. Cl.
CPC ............. *H04N 25/47* (2023.01); *H04N 25/44* (2023.01); *H04N 25/60* (2023.01); *H04N 25/773* (2023.01); *H04N 25/779* (2023.01); *H04N 25/7795* (2023.01)

(58) Field of Classification Search
CPC ........ H04N 25/47; H04N 25/44; H04N 25/60; H04N 25/773; H04N 25/779; H04N 25/7795
See application file for complete search history.

(56) References Cited

U.S. PATENT DOCUMENTS

| | | | |
|---|---|---|---|
| 12,520,055 B2 * | 1/2026 | Semel ................... | H04N 25/47 |
| 2021/0312189 A1 * | 10/2021 | Bisulco .............. | H04L 43/0876 |
| 2024/0064422 A1 * | 2/2024 | Ke .......................... | H04N 25/47 |

* cited by examiner

*Primary Examiner* — Mekonnen D Dagnew
(74) *Attorney, Agent, or Firm* — Muncy, Geissler, Olds & Lowe, P.C.

(57) ABSTRACT

The present disclosure relates to an image sensor with on-chip event-based vision sensor (EVS) denoiser. The image sensor comprises a pixel array, a denoise frame buffer, a denoise processor and an event scanner. The pixel array incudes a plurality of EVS pixels. The denoise frame buffer is configured to store an event bit map. The event bit map includes an array of units. The units have a one-to-one correspondence with the EVS pixels of the pixel array. Each unit stores an event bit. The denoise processor includes logic storing instructions that, when executed by the denoise processor, causes the image sensor to perform operations comprising: updating the event bits of the event bit map; and filtering an event stream sensed by the pixel array based on the event bit map to output an EVS data. The event scanner is configured to receive the filtered event stream from the denoise processor.

20 Claims, 10 Drawing Sheets

IMAGE SENSOR WITH ON-CHIP EVENT-BASED VISION SENSOR (EVS) DENOISER

BACKGROUND OF THE INVENTION

1. Field of the Invention

The present disclosure relates to an image sensor, and more particularly, to an image sensor with an on-chip event-based vision sensor (EVS) denoiser.

2. Description of the Related Art

In the field of image sensor technology, it is well-known that noise in the circuit can cause pixels to generate events even in the absence of any actual change in brightness. This phenomenon can significantly impact the accuracy and reliability of the data collected by the sensor.

To address this issue, on-chip event-based sensor (EVS) denoisers have been developed to filter out undesired noise and improve the quality of EVS data. By implementing a denoiser directly on the sensor chip, the need for encoding and transferring the noise out of the sensor is eliminated, resulting in significant power savings.

The denoiser works by analyzing the events generated by the pixels and distinguishing between genuine changes in brightness and noise-induced events. By filtering out the noise at the source, the denoiser ensures that only accurate and reliable data is transmitted from the sensor, leading to improved performance and efficiency in applications such as machine vision, autonomous vehicles, and robotics.

Overall, the development of on-chip EVS denoisers represents a significant advancement in image sensor technology, as it not only improves data quality but also contributes to power savings and overall system efficiency. This innovation has the potential to have a wide-ranging impact on various industries and applications that rely on high-quality, low-noise image data.

SUMMARY OF THE INVENTION

One aspect of the present disclosure provides an image sensor. The image sensor comprises a pixel array, a denoise frame buffer, a denoise processor and an event scanner. The pixel array incudes a plurality of EVS pixels. The denoise frame buffer is configured to store an event bit map. The event bit map includes an array of units. The units have an one-to-one correspondence with the EVS pixels of the pixel array. Each unit stores an event bit. The denoise processor includes logic storing instructions that, when executed by the denoise processor, causes the image sensor to perform operations comprising: receiving a first set of events sensed by the pixel array; inputting the first set of events to the event bit map, wherein a bitwise OR operation is performed between each of the first set of events and the event bits of the event bit map based on the one-to-one correspondence to update the event bits of the event bit map; receiving a second set of events sensed by the pixel array; inputting the second set of events to the event bit map, wherein a bitwise OR operation is performed between each of the second set of events and the event bits of the event bit map based on the one-to-one correspondence to update the event bits of the event bit map; and filtering an event stream sensed by the pixel array based on the event bits of the event bit map to output an EVS data. The event scanner is configured to receive the filtered event stream from the denoise processor.

Another aspect of the present disclosure provides an image sensor. The image sensor comprises a pixel array, a denoise frame buffer and a denoise processor. The pixel array incudes a plurality of EVS pixels. The denoise frame buffer is configured to store an event bit map. The event bit map includes an array of units. The units have an one-to-one correspondence with the EVS pixels of the pixel array. Each unit stores an event bit. The denoise processor includes logic storing instructions that, when executed by the denoise processor, causes the image sensor to perform operations comprising: building the event bit map by performing a bitwise OR operation between each of a first set of events sensed by the pixel array and the event bits of the event bit map based on the one-to-one correspondence for a first period of time; after the event bit map is built, accumulating the event bit map by performing a bitwise OR operation between each of a second set of events sensed by the pixel array and the event bits of the event bit map based on the one-to-one correspondence for a second period of time; upon a first condition is met during accumulating the event bit map with the second set of events, refreshing the event bit map by overwriting the event bits of the event bit map with a third set of events based on the one-to-one correspondence for a third period of time; upon a second condition is met during refreshing the event bit map with the third set of events, accumulating the event bit map by performing a bitwise OR operation between each of a fourth set of events sensed by the pixel array and the event bits of the event bit map based on the one-to-one correspondence for a fourth period of time; and upon a third condition is met during accumulating the event bit map with the fourth set of events, refreshing the event bit map by overwriting the event bits of the event bit map with a fifth set of events based on the one-to-one correspondence for a fifth period of time.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, dimensions of the various features may be arbitrarily increased or reduced for clarity of discussion.

DETAILED DESCRIPTION OF THE DISCLOSURE

Figure 1:
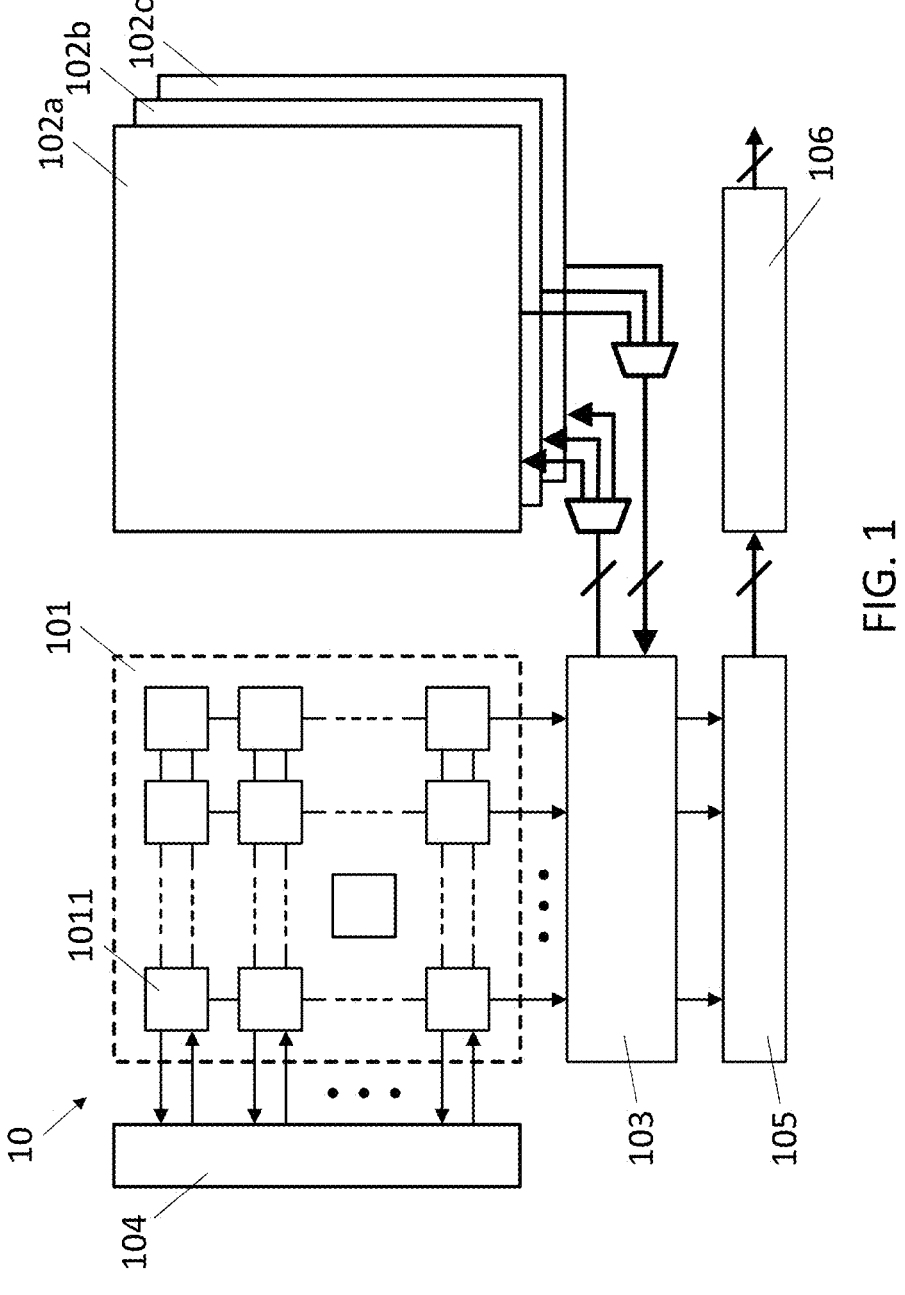
FIG. 1 illustrates an image sensor with an on-chip EVS denoiser, in accordance with some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from normal deviation found in the respective testing measurements. Also, as used herein, the terms "substantially," "approximately" and "about" generally mean within a value or range that can be contemplated by people having ordinary skill in the art. Alternatively, the terms "substantially," "approximately" and "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages, such as those for quantities of materials, durations of times, temperatures, operating conditions, ratios of amounts, and the likes thereof disclosed herein, should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Existing algorithms for event-based sensor (EVS) denoisers are known to be too complex and memory intensive to be implemented on chip. These denoisers have several limitations that hinder their practical implementation.

Firstly, maintaining a spatiotemporal sliding window requires a large buffer. For example, a 540×960 pixel event map requires a buffer size for approximately 530 MB, including geometry location and time stamps (at least 24 bits/event). Such large buffer size poses a challenge for on-chip implementation due to limited memory resources. Secondly, the data from the EVS needs to be stored and processed in different formats, requiring additional steps such as storage, conversion, decoding, etc. These additional steps add to the complexity and memory requirements of the denoiser, making it impractical for on-chip processing. Lastly, the existing denoisers cannot be achieved by on-chip processing, further limiting their practical implementation in EVS systems.

In order to address these limitations, the present disclosure introduces a novel denoising algorithm that is specifically designed for on-chip implementation. The algorithm aims to reduce the complexity and memory requirements of existing denoisers, making it feasible for practical implementation in EVS systems.

The proposed algorithm utilizes a novel approach to denoising that eliminates the need for maintaining a large spatiotemporal sliding window. Instead, it leverages a more efficient data processing technique that reduces the memory requirements and complexity of the denoiser. This approach allows for on-chip processing of the EVS data, overcoming the limitations of existing denoisers. Furthermore, the algorithm is designed to streamline the data storage and processing requirements, eliminating the need for storing and processing data in different formats. This simplifies the overall denoising process and reduces the memory and processing overhead, making it suitable for on-chip implementation.

Accordingly, the proposed denoising algorithm addresses the limitations of existing denoisers by providing a more efficient and practical solution for on-chip implementation in EVS systems. This innovative approach has the potential to significantly improve the performance and practicality of EVS denoisers, making them more accessible for a wide range of applications.

The main idea behind the disclosed technology is to provide a hardware-friendly, on-chip implementation for event-based sensor (EVS) denoising, with a focus on saving memory resources. The proposed solution aims to significantly reduce the memory requirements by utilizing a bit frame buffer and binary representation, resulting in a more efficient use of memory, with an estimated reduction to as low as 0.5 megabits.

The disclosed technology offers several advantages over existing denoising algorithms.

Firstly, it minimizes memory usage by up to 8000 times, compared to known denoisers. This substantial reduction in memory requirements is a significant improvement and allows for more practical on-chip implementation in EVS systems.

Secondly, the proposed algorithm also reduces the computational cost associated with denoising, making it more efficient and less resource-intensive. This reduction in computational cost further contributes to the feasibility of on-chip implementation and enhances the overall performance of the denoiser.

Additionally, the algorithm is designed to make the output sensor data more compact while preserving the integrity of valid events. This means that the denoising process does not compromise the essential information captured by the EVS, ensuring that the output remains accurate and reliable. Moreover, the on-chip design of the algorithm enables real-time processing, low-latency operation, and improved energy efficiency. These features are crucial for EVS applications, as they contribute to the overall responsiveness and power efficiency of the system.

In summary, the disclosed technology offers a hardware-friendly, on-chip implementation for EVS denoising, with a primary focus on memory savings. The algorithm provides significant advantages, including a drastic reduction in memory usage, decreased computational cost, compact output sensor data, and the ability to achieve real-time, low-latency processing with improved energy efficiency. These features make the disclosed technology a promising solution for practical implementation in EVS systems, with the potential to enhance performance and usability across various applications.

FIG. 1 illustrates an image sensor 10 with an on-chip EVS denoiser, in accordance with some embodiments of the present disclosure.

As shown in FIG. 1, the image sensor 10 comprises: a pixel array 101, denoiser frame buffers 102a, 102b, 102c, a denoise processor 103, a row controller 104, an event scanner 105 and a data path 106.

The pixel array 101 includes a plurality of event-based sensor (EVS) pixels 1011. Each of the denoise frame buffers 102a, 102b, 102c is configured to store an event bit map with binary representation. The event bit map includes an array of units. The array of units have an one-to-one correspondence with the EVS pixels 1011 of the pixel array 101. Each unit stores an event bit. The denoise processor 103 executes logic storing instructions so that the image sensor 10 performs denoiser operations. The event scanner 105 is configured to receive the filtered event stream from the denoise processor 103.

Figure 2:
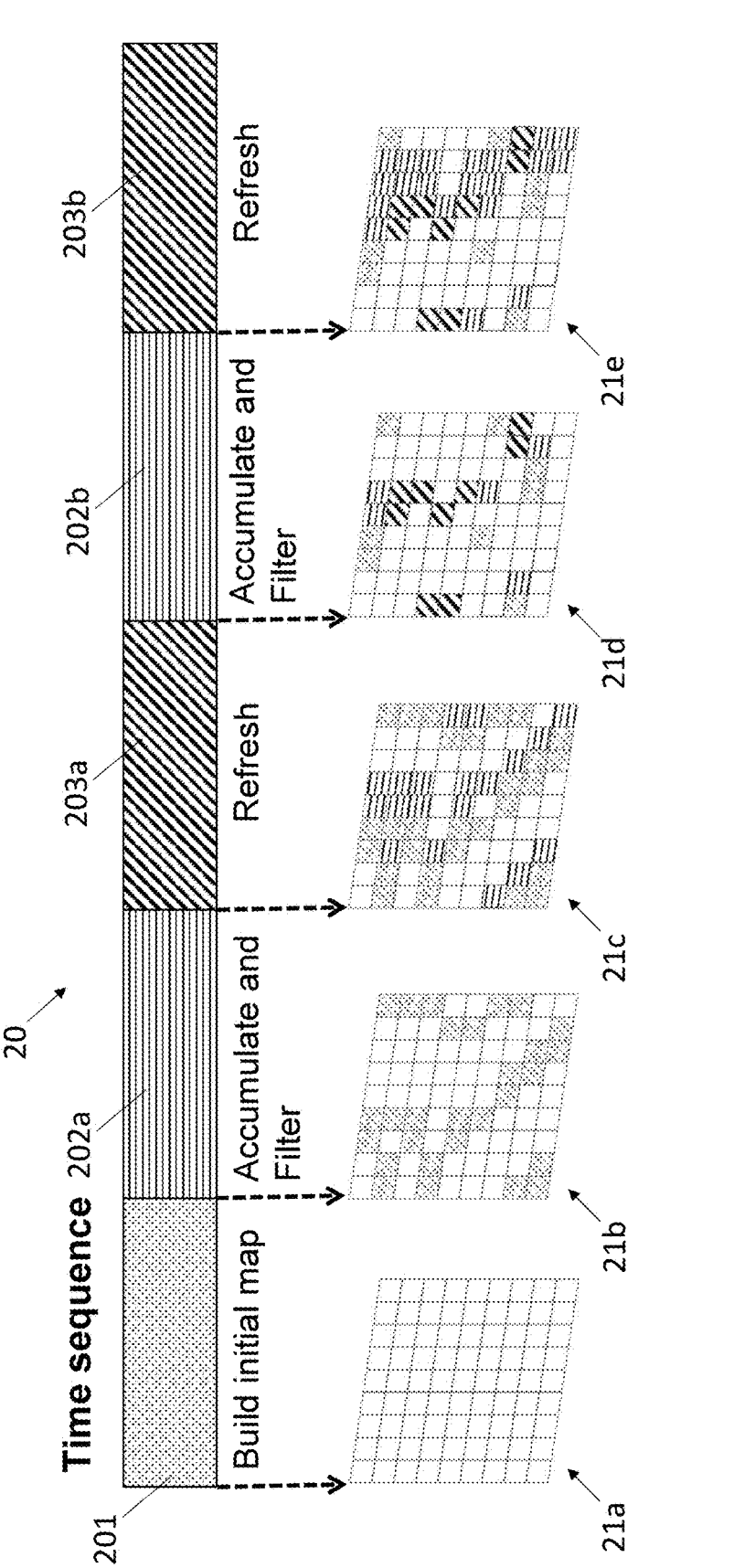
FIG. 2 illustrates a time sequence of the denoise operations, in accordance with some embodiments of the present disclosure.

FIG. 2 illustrates a time sequence 20 of the denoise operations, in accordance with some embodiments of the present disclosure.

The time sequence 20 of the denoise operations includes at least three different types of operations. In some embodiments of the present disclosure, the types of operations include: building an initial map 201, accumulating and filtering 202a, 202b and refreshing 203a, 203b.

The process of building an initial map 201 involves creating an event bit map within one of the denoiser frame buffers. Referring to FIG. 2, initially, the event bit map 21a is blank. Building an initial map 201 also includes receiving a first set of events from the pixel array to start accumulating event data for the event bit map 21a. During this initial accumulation, the first set of events is inputted to the event bit map 21a, and then a bitwise OR operation is performed between each of the first set of events and the event bits of the event bit map 21a, based on the one-to-one correspondence, to update the event bits of the event bit map 21a. After a predetermined period for building an initial map 201, as shown in the event bit map 21b in FIG. 2, several event bits stored in the event bit map 21b have been accumulated with binary representation (represented by the dot pattern) with the first set of events sensed by the pixel array.

In some embodiments of the present disclosure, during this initial accumulation, the first set of events overwrites the event bits of the event bit map 21a based on the one-to-one correspondence to update the event bits of the event bit map 21a.

Following building an initial map 201, the next step is to perform the operation of accumulating and filtering 202a. This involves receiving a second set of events sensed by the pixel array and inputting them to the event bit map 21b. A bitwise OR operation is then carried out between each of the second set of events and the event bits of the event bit map 21b, based on the one-to-one correspondence, in order to update the event bits of the event bit map 21b. As depicted in the event bit map 21c in FIG. 2, several event bits stored in the event bit map 21c have been accumulated with binary representation (represented by the horizontal-line pattern) with the second set of events sensed by the pixel array. Furthermore, the process of accumulating and filtering 202a also involves filtering an event stream sensed by the pixel array based on the event bits of the event bit map 21b, in order to output EVS data.

After accumulating and filtering 202a, the next step is to perform the operation of refreshing 203a. Refreshing 203a involves receiving a third set of events sensed by the pixel array and inputting these events to the event bit map 21c. Each event in the third set overwrites the corresponding event bits in the event bit map 21c, updating the event bits. As shown in the event bit map 21d in FIG. 2, several event bits stored in the event bit map 21d have been accumulated with binary representation (represented by the slash pattern) with the third set of events sensed by the pixel array.

Following refreshing 203a, the next step is to perform the operation of accumulating and filtering 202b. In certain embodiments of the present disclosure, accumulating and filtering 202b is similar to accumulating and filtering 202a. This process involves receiving a fourth set of events sensed by the pixel array and inputting these events to the event bit map 21d. A bitwise OR operation is then carried out between each of the fourth set of events and the event bits of the event bit map 21d, based on the one-to-one correspondence, in order to update the event bits of the event bit map 21d. As depicted in the event bit map 21e in FIG. 2, several event bits stored in the event bit map 21e have been accumulated with binary representation (represented by the horizontal-line pattern) with the fourth set of events sensed by the pixel array. Furthermore, accumulating and filtering 202b also involves filtering an event stream sensed by the pixel array based on the event bits of the event bit map 21d, in order to output EVS data.

Following accumulating and filtering 202b, the subsequent operation of refreshing 203b is carried out. In certain embodiments of the present disclosure, refreshing 203b is similar to refreshing 203a. The process of refreshing 203b involves receiving a fifth set of events detected by the pixel array and inputting these events into the event bit map 21c. Each event in the fifth set overwrites the corresponding event bits in the event bit map 21e, updating the event bits based on a one-to-one correspondence. Multiple event bits stored in the event bit map 21e have been accumulated with the fifth set of events detected by the pixel array.

In certain embodiments of the present disclosure, the process of accumulating and filtering, as well as the process of refreshing, may be performed alternatively as long as events continue to be sensed by the pixel array. Each of the aforementioned operations is described in detail in FIGS. 3A-3C.

Figure 3A:
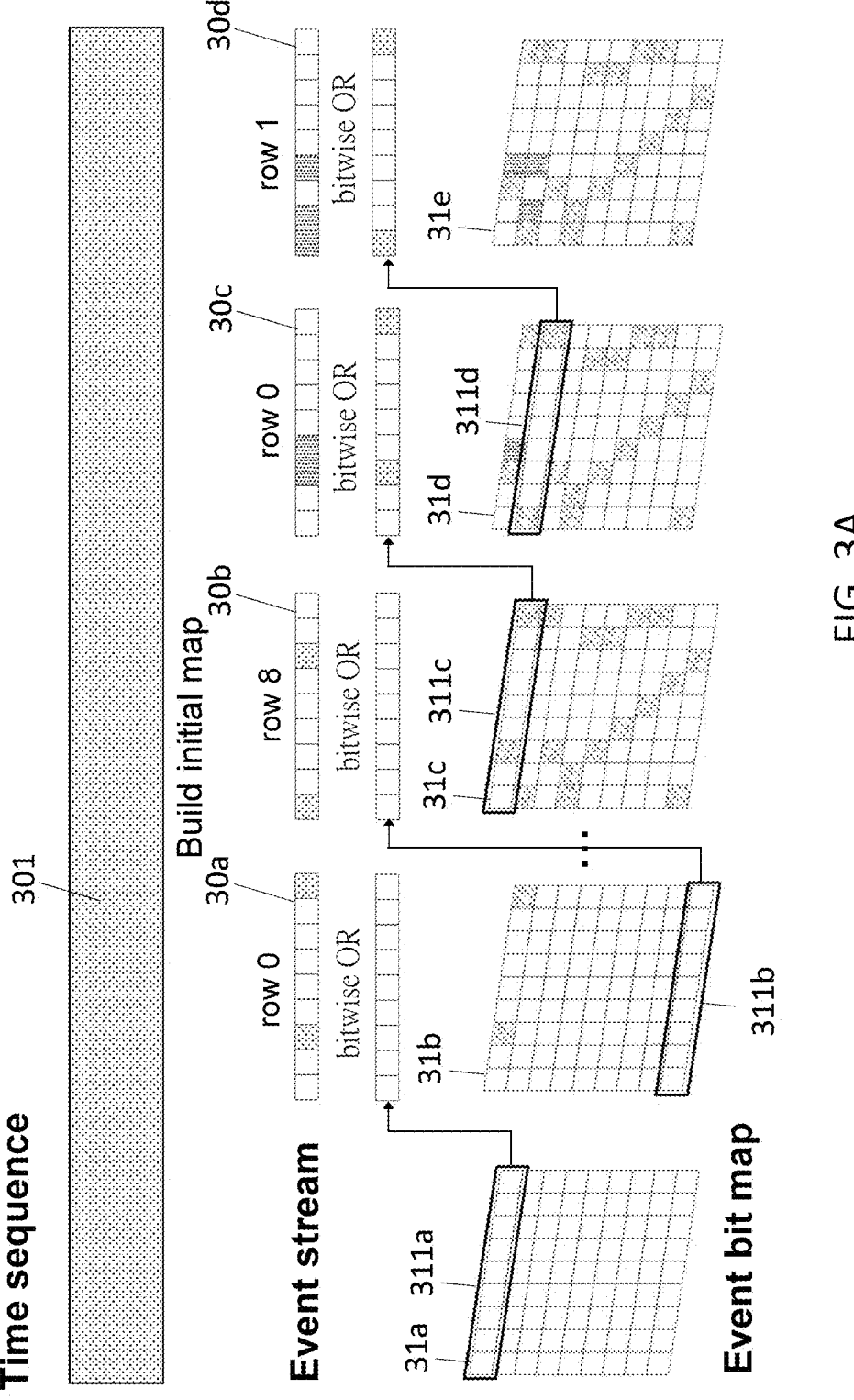
FIG. 3A illustrates the operation of building an initial map in the denoise operations, in accordance with some embodiments of the present disclosure.

FIG. 3A illustrates the operation of building an initial map in the denoise operations, in accordance with some embodiments of the present disclosure.

As illustrated in FIG. 3A, when initiating the process of building an initial map 301, an event bit map 31*a* is established in one of the denoiser frame buffers. In certain embodiments of the present disclosure, the event bit map 31*a* is the same size as the pixel array, ensuring a one-to-one correspondence between the units of the event bit map 31*a* and the EVS pixels of the pixel array. Each unit of the event bit map 31*a* stores an event bit, with all units initially containing blank event bits. Subsequently, an event stream 30*a* from the first row (row 0) of the pixel array is inputted, and a bitwise OR operation is conducted between the event stream 30*a* and the first row 311*a* of the event bit map 31*a*. As depicted in FIG. 3A, the third and ninth bits of the event stream 30*a* (represented by the sparse dot pattern) indicate that the EVS pixels at the corresponding locations of the pixel array have detected events. The outcome of the bitwise OR operation is displayed as the first row (top row) of the event bit map 31*b*, with the third and ninth bits of the first row changing to a sparse dot pattern, signifying the recording of the event stream 30*a* in the event bit map 31*b*. This process is repeated for each event stream corresponding to the second row (row 1) to the eighth row (row 7) of the pixel array, although not shown in FIG. 3A. Subsequently, an event stream 30*b* from the ninth row (row 8) of the pixel array is inputted, and a bitwise OR operation is performed between the event stream 30*b* and the ninth row 311*b* of the event bit map 31*b*. As shown in FIG. 3A, the first and seventh bits of the event stream 30*b* (represented by the sparse dot pattern) indicate that the EVS pixels at the corresponding locations of the pixel array have detected events. The result of the bitwise OR operation is displayed as the ninth row (bottom row) of the event bit map 31*c*, with the first and seventh bits of the ninth row changing to a sparse dot pattern, indicating the recording of the event stream 30*b* in the event bit map 31*c*. In certain embodiments of the present disclosure, the types of events to be accumulated can be raw, filtered or extrapolated.

In certain embodiments of the present disclosure, the time required to build an initial map 301 is longer than the time interval for a complete scan of all the EVS pixels in the pixel array. This means that the event bit map may record multiple occurrences of the event stream corresponding to each row of the pixel array by accumulating the events. For example, as depicted in FIG. 3A, an event stream 30*c* from the first row (row 0) of the pixel array is inputted again. A bitwise OR operation is then performed between the event stream 30*c* and the first row 311*c* of the event bit map 31*c*. As shown in FIG. 3A, the third and fourth bits of the event stream 30*c* (represented by the dense dot pattern) indicate that the EVS pixels at the corresponding locations of the pixel array have detected events. The result of the bitwise OR operation is shown as the first row (the top row) of the event bit map 31*d*. The third and ninth bits of the first row of the event bit map 31*d* remain as the spare dot pattern since events have already been recorded in those units of the event bit map 31*c*. The fourth bit of the first row of the event bit map 31*d* changes to a dense dot pattern, indicating that the event stream 30*c* has been recorded in the event bit map 31*d*. Subsequently, as shown in FIG. 3A, an event stream 30*d* from the second row (row 1) of the pixel array is inputted again. A bitwise OR operation is performed between the event stream 30*d* and the second row 311*d* of the event bit map 31*d*. As shown in FIG. 3A, the third and fourth bits of the event stream 30*c* (represented by the dense dot pattern)

indicate that the EVS pixels at the corresponding locations of the pixel array have detected events. The result of the bitwise OR operation is shown as the first row (the top row) of the event bit map 31*d*. The third and ninth bits of the first row of the event bit map 31*d* remain as the spare dot pattern since events have already been recorded in those units of the event bit map 31*c*. The fourth bit of the first row of the event bit map 31*d* changes to a dense dot pattern, indicating that the event stream 30*c* has been recorded in the event bit map 31*d*.

Figure 3B:
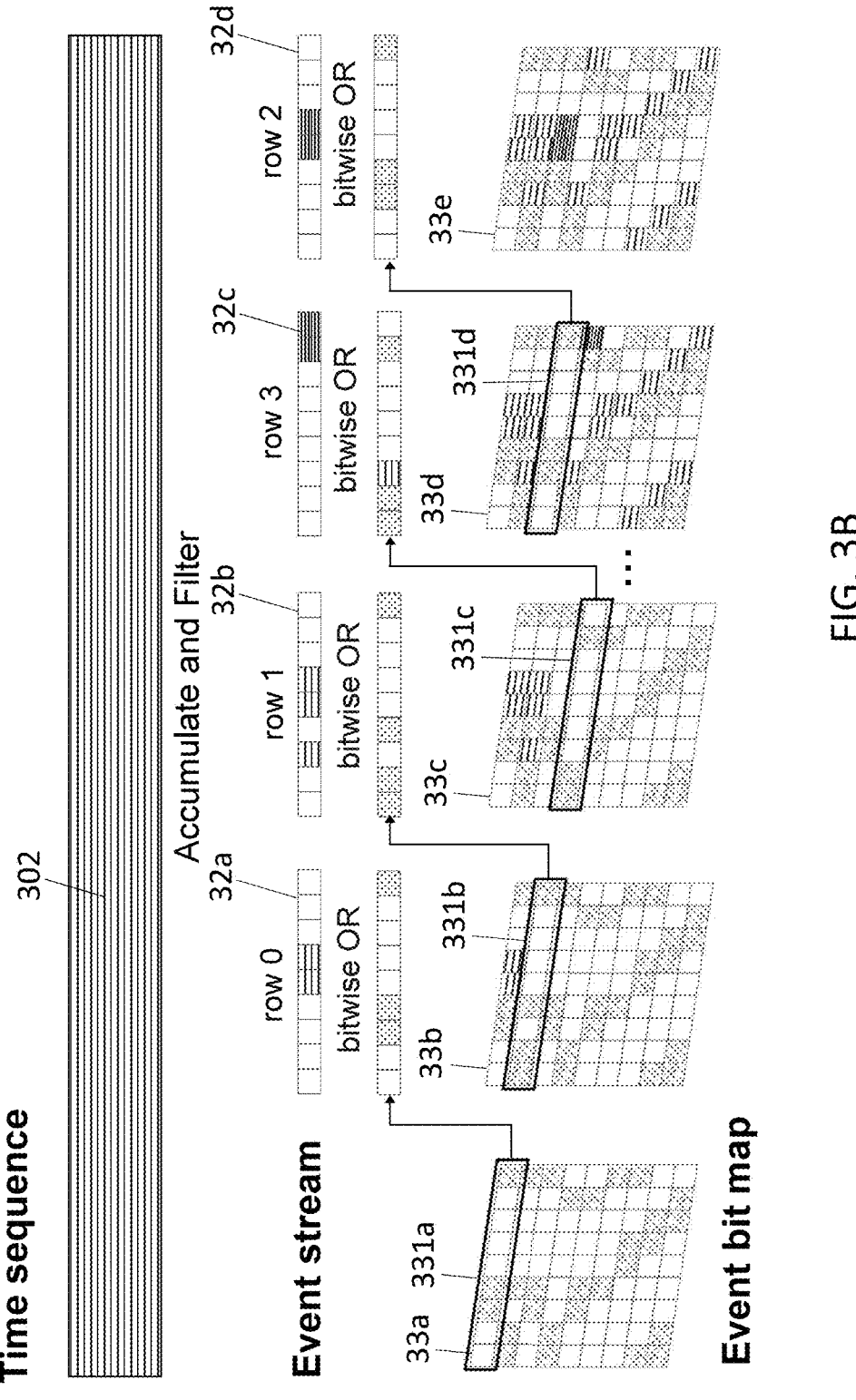
FIG. 3B illustrates the details of the accumulating in the operation of accumulating and filtering in the denoise operations, in accordance with some embodiments of the present disclosure.

FIG. 3B illustrates details of the accumulating in the the operation of accumulating and filtering 302 in the denoise operations, in accordance with some embodiments of the present disclosure.

Referring to FIG. 3B, an event stream 32*a* associated with the first row (row 0) of the pixel array is inputted. A bitwise OR operation is conducted between the event stream 32*a* and the first row 331*a* of the event bit map 33*a*. As depicted in FIG. 3B, the fifth and sixth bits of the event stream 32*a* (indicated by the horizontal-line pattern) indicate that the EVS pixels at the corresponding locations of the pixel array have detected events. The third, fourth, and ninth bits of the first row 331*a* of the event bit map 33*a* (represented by the sparse dot pattern) have already been accumulated with events. The outcome of the bitwise OR operation is displayed as the first row (the top row) of the event bit map 33*b*. The fifth and sixth bits of the first row of the event bit map 33*c* change to the horizontal-line pattern, signifying that the event stream 32*a* has been recorded in the event bit map 33*b*. Subsequently, as shown in FIG. 3B, an event stream 32*b* associated with the second row (row 1) of the pixel array is inputted. A bitwise OR operation is carried out between the event stream 32*b* and the second row 331*b* of the event bit map 33*a*. As illustrated in FIG. 3B, the third, fifth, and sixth bits of the event stream 32*b* (indicated by the sparse horizontal-line pattern) indicate that the EVS pixels at the corresponding locations of the pixel array have detected events. The first, second, fourth, and ninth bits of the second row 331*b* of the event bit map 33*b* (represented by the sparse dot pattern) have already been accumulated with events. The result of the bitwise OR operation is displayed as the second row of the event bit map 33*c*. The third, fifth, and sixth bits of the second row of the event bit map 33*c* change to the sparse horizontal-line pattern, indicating that the event stream 32*b* has been recorded in the event bit map 33*c*. This same procedure (not shown in FIG. 3B) is repeated for event streams corresponding to the rows of the pixel array.

Next, the event stream 32*c* from the fourth row (row 3) of the pixel array is received. A bitwise OR operation is then carried out between the event stream 32*c* and the fourth row 331*c* of the event bit map 31*c*. As depicted in FIG. 3B, the eighth and ninth bits of the event stream 32*c* (illustrated by the dense horizontal-line pattern) indicate that the EVS pixels at the corresponding locations of the pixel array have detected events. The result of the bitwise OR operation is displayed as the fourth row of the event bit map 33*d*. The first, second, and eighth bits of the fourth row of the event bit map 33*d* remain as the sparse dot pattern, as events have already been recorded in those units of the event bit map 33*c*. The third bit of the fourth row of the event bit map 33*d* is in the horizontal-line pattern, as events had been recorded in those units of the event bit map 33*d* at a certain time before the event stream 32*c* was received. The ninth bit of the fourth row of the event bit map 33*c* changes to the dense horizontal-line pattern, indicating that the event stream 32*c* has been recorded in the event bit map 33*d*.

In certain embodiments of the present disclosure, the event streams from the rows of the pixel array may be inputted in a non-sequential order. For instance, the event streams can be inputted in a "snake" order, where the order of inputting rows is reversed in the next round after inputting the event stream from a row of the pixel array. As illustrated in FIG. 3B, following the input of the event stream 32c from a fourth row (row 3) of the pixel array, an event stream 32d from a third row (row 2) of the pixel array is then inputted. A bitwise OR operation is carried out between the event stream 32d and the third row 331d of the event bit map 31d. As shown in FIG. 3B, the fifth and sixth bits of the event stream 32d (represented by the dense horizontal-line pattern) indicate that the EVS pixels at the corresponding locations of the pixel array detect events. The result of the bitwise OR operation is displayed as the third row of the event bit map 33c. The third, fourth, and ninth bits of the third row of the event bit map 33e remain as the spare dot pattern since events have already been recorded in those units of the event bit map 33d. The fifth and sixth bits of the third row of the event bit map 33e change to the dense horizontal-line pattern, indicating that the event stream 32d has been recorded in the event bit map 33c.

During the process of accumulating and filtering events over time, the event bit map can be utilized to filter the event stream detected by the pixel array. The specific methods for filtering event streams are outlined in FIG. 4.

Figure 3C:
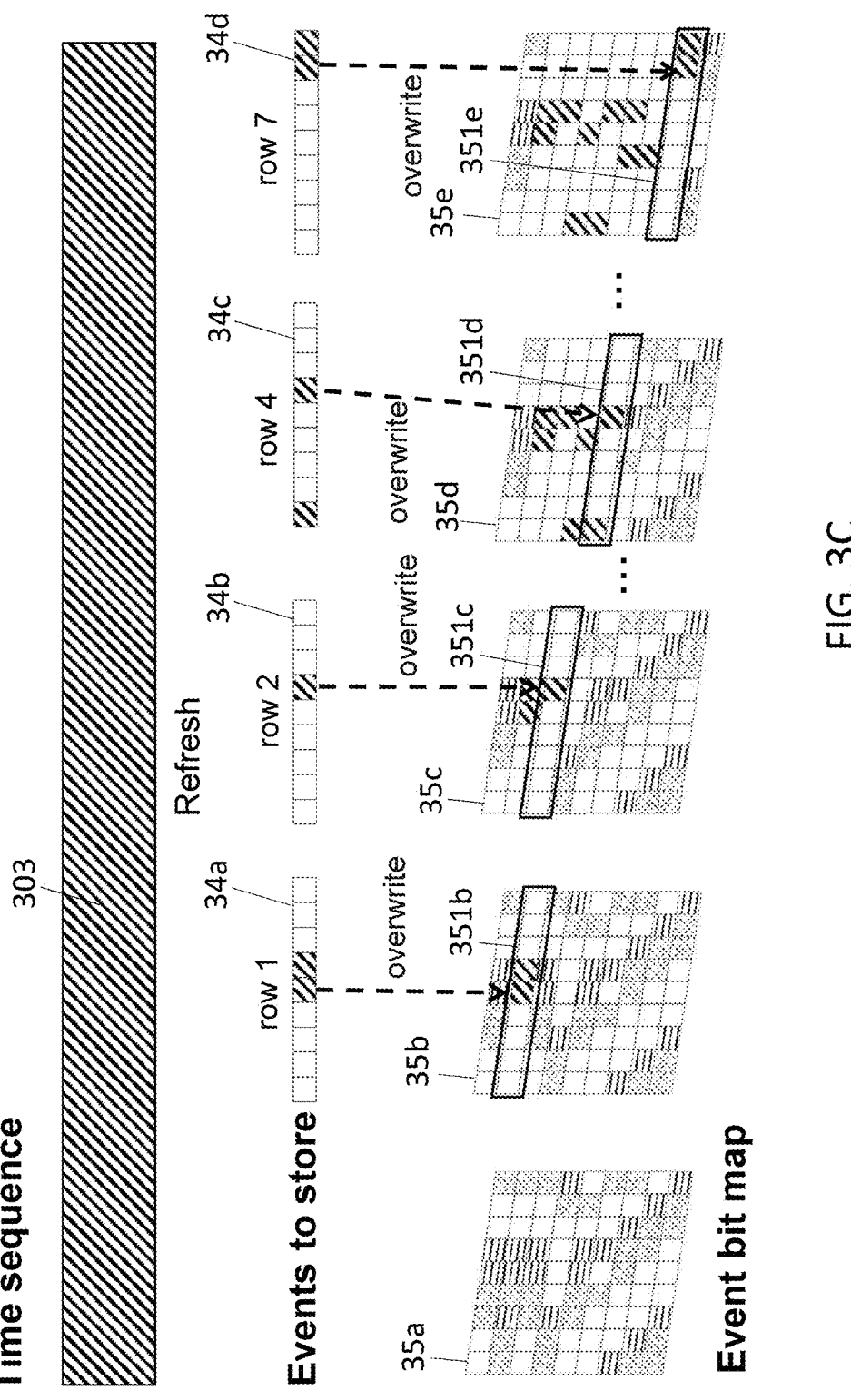
FIG. 3C illustrates the operation of refreshing in the denoise operations, in accordance with some embodiments of the present disclosure.

FIG. 3C illustrates the operation of refreshing 303 in the denoise operations, in accordance with some embodiments of the present disclosure.

Referring to FIG. 3C, an event stream 34a from the second row (row 1) of the pixel array is input. This event stream 34a overwrites the second row of the event bit map 35a. In FIG. 3C, the fifth and sixth bits of the event stream 34a (indicated by the slash pattern) indicate that the EVS pixels at the corresponding locations of the pixel array have detected events. The result of this overwriting is depicted as the second row 351b of the event bit map 35b. The fifth and sixth bits of the second row 351b of the event bit map 35b change to the slash pattern, indicating that the event stream 34a has been recorded in the event bit map 35b. Subsequently, as shown in FIG. 3C, an event stream 34b from the third row (row 2) of the pixel array is input. This event stream 34b overwrites the third row of the event bit map 35b. In FIG. 3C, the sixth bit of the event stream 34b (indicated by the slash pattern) represents that the EVS pixel at the corresponding location of the pixel array has detected events. The result of this overwriting is shown as the third row of the event bit map 35c. The sixth bit of the third row of the event bit map 35d changes to the slash pattern, indicating that the event stream 34b has been recorded in the event bit map 35c. The same procedure (not shown in FIG. 3C) is repeated for the event stream corresponding to the fourth row of the pixel array.

Next, in FIG. 3C, an event stream 34c from the fifth row (row 4) of the pixel array is input. This event stream 34c overwrites the fifth row of the event bit map 35c. As depicted in FIG. 3C, the first and sixth bits of the event stream 34c (indicated by the slash pattern) indicate that the EVS pixels at the corresponding locations of the pixel array have detected events. The result of this overwriting is shown as the fifth row of the event bit map 35d. The first and sixth bits of the fifth row of the event bit map 35d change to the slash pattern, indicating that the event stream 34c has been recorded in the event bit map 35d. The same procedures (not shown in FIG. 3C) are repeated for the event streams corresponding to the sixth and seventh rows of the pixel array. Then, as shown in FIG. 3C, an event stream 34d from the eighth row (row 7) of the pixel array is input. This event stream 34d overwrites the eighth row of the event bit map 35d. As depicted in FIG. 3C, the eighth and ninth bits of the event stream 34d (indicated by the slash pattern) represent that the EVS pixels at the corresponding locations of the pixel array have detected events. The result of this replacement is shown as the eighth row of the event bit map 35e. The eighth and ninth bits of the eighth row of the event bit map 35d change to the slash pattern, indicating that the event stream 34d has been recorded in the event bit map 35c.

Figure 4:
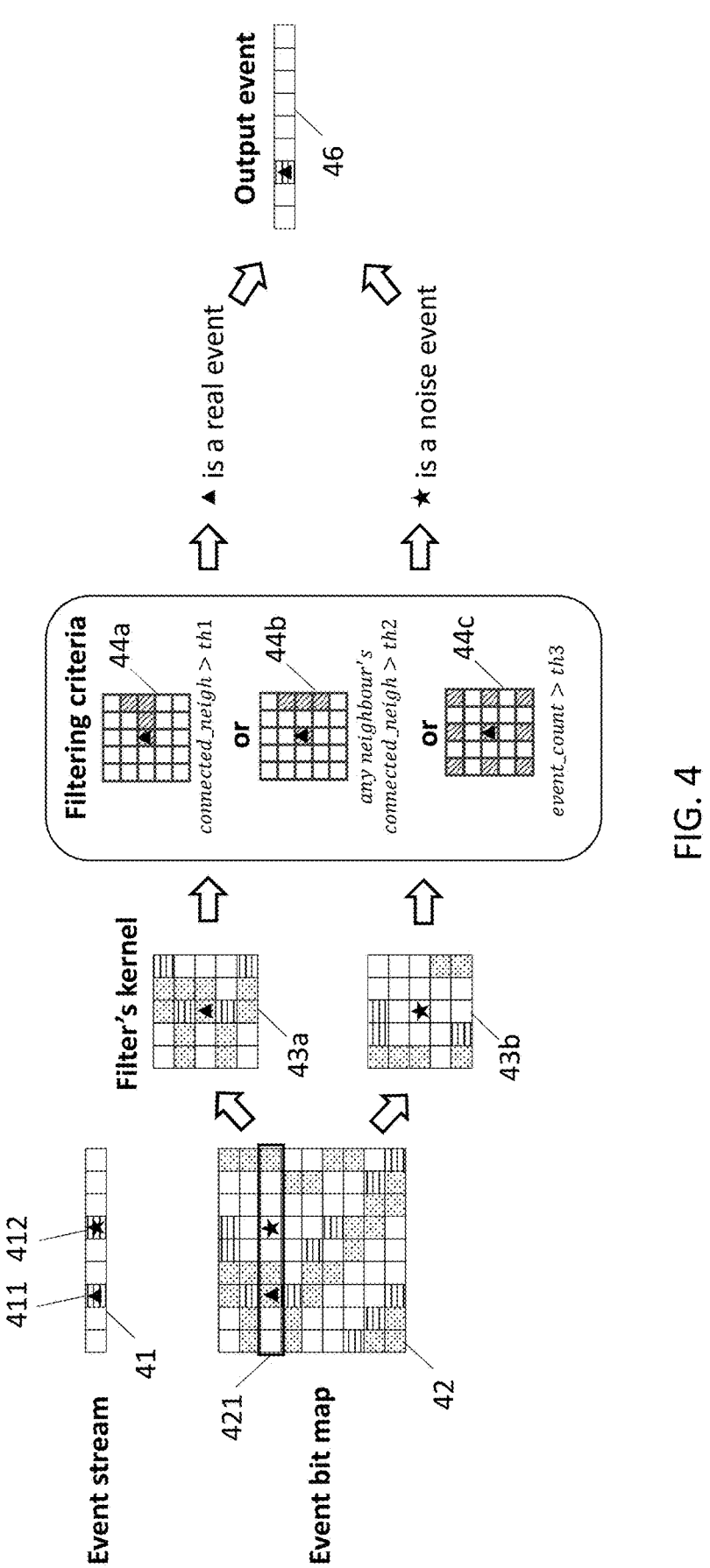
FIG. 4 illustrates how an event stream is filtered by applying different filtering criteria, in accordance with some embodiments of the present disclosure.

FIG. 4 illustrates how an event stream is filtered by applying different filtering criteria to the event bit map, in accordance with some embodiments of the present disclosure.

In certain embodiments of the present disclosure, the event bit map is utilized during the accumulating and filtering 202a and 202b in FIG. 2 or the accumulating and filtering 302 in FIG. 3b of the time sequence to filter the event streams sensed by the pixel arrays and generate filtered output events. Specifically, the event stream to be filtered corresponds to a set of events sensed by a row of the plurality of EVS pixels of the pixel array. The process of filtering the event stream involves identifying locations on the event bit map that correspond to each of the fourth set of events, and determining whether the event bits of the event bit map within a predetermined window around each of the locations meet a first specific pattern of a first filtering criterion. For instance, if the event bits within the predetermined window around a location meet the first specific pattern of the first filtering criterion, the event corresponding to that location is retained in the filtered event stream. Conversely, if the event bits within the predetermined window around a location do not meet the first specific pattern of the first filtering criterion, the event corresponding to that location is removed from the filtered event stream.

In certain embodiments of the present disclosure, if the event bits of the event bit map within the predetermined window around each of the locations do not satisfy the first specific pattern of the first filtering criterion, the determination is made as to whether the event bits of the event bit map within the predetermined window around each of the locations satisfy a second specific pattern of a second filtering criterion. The second specific pattern is different from the first specific pattern. If the event bits of the event bit map within the predetermined window around one of the locations satisfy the second specific pattern of the second filtering criterion, the event of the set of events corresponding to the location is retained in the filtered event stream. If the event bits of the event bit map within the predetermined window around one of the locations do not satisfy the second specific pattern of the second filtering criterion, the event of the set of events corresponding to the location is removed from the filtered event stream.

In certain embodiment of the present disclosure, the filter make use of the connectivity information within the local window/kernel/neighborhoods.

Referring to FIG. 4, a stream of events 41 is received from the third row of the pixel array. The horizontal-line pattern represents the third bit 411 and the sixth bit 412 of the event stream 41. The triangle pattern indicates an event at the third bit 411 of the event stream 41 and its corresponding locations, while the star pattern indicates an event at the sixth bit 412 of the event stream 41 and its corresponding locations. In the event bit map 42 shown in FIG. 4, the third, fourth, and ninth bits of the third row 421 have been accumulated and are represented by the dot pattern. The third bit and the sixth bit of the third row 421 correspond to the third bit 411 and the sixth bit 412 of the event stream 41, and are marked with the triangle pattern and the star pattern, respectively. A filter's kernel 43a displays a 5×5 square of units around the event represented by the triangle pattern corresponding to the third bit of the third row 421 of the event bit map 42. Similarly, a filter's kernel 43b shows a 5×5 square of units around the event represented by the star pattern corresponding to the sixth bit of the third row 421 of the event bit map 42. In certain embodiments of the present disclosure, the filter's kernel size can be of any arbitrary size: 3×3, . . . , 5×5, etc.

In certain embodiments of the present disclosure, the filter's kernel 43a and the filter's kernel 43b undergo filtering using distinct criteria. All of the filtering criteria 44a, 44b, and 44c initially verify if the event bit map's bit at the corresponding location has been accumulated in the event bit map. Subsequently, the neighboring units in the filter's kernels are examined. In certain embodiments of the present disclosure, the filtering criteria can be based on its center/off-center connectivity and/or total event count.

For instance, filtering criterion 44a involves checking whether the connected neighboring units in the 5×5 square of units around the event (represented by the triangle pattern) satisfy a specific number, threshold th1. As depicted in FIG. 4, in some embodiments of the present disclosure, the threshold th1 is three. Accordingly, there must be three connected bits that are within the 5×5 square of units and have been accumulated in the event bit map, and at least one of the three connected bits should be connected to the event (represented by the triangle pattern). In some embodiments of the present disclosure, the threshold th1 can be two, four or any other positive integers depending on the filter's kernel size. For example, for a filter's kernel size of 3×3, the threshold th1 may be two.

The filtering criterion 44b involves verifying whether the neighboring units of the event (represented by the triangle pattern) have connected neighboring units within the 5×5 square of units around the event (represented by the triangle pattern) meet a specific number, threshold th2. As depicted in FIG. 4, in some embodiments of the present disclosure, the threshold th2 is three. Accordingly, there must be three connected bits that are within the 5×5 square of units and have been accumulated in the event bit map, and the event (represented by the triangle pattern) located at the center of the kernel is not necessary to connected to any one of the three connected bits read from the event bit map. In some embodiments of the present disclosure, the threshold th2 can be two, four or any other positive integers depending on the filter's kernel size. For example, for a filter's kernel size of 3×3, the threshold th2 may be two.

The filtering criterion 44c involves verifying whether the non-connected units in the 5×5 square around the event (represented by the triangle pattern) meet a specific number, threshold th3. As illustrated in FIG. 4, in some embodiments of the present disclosure, the threshold th3 is eight. Accordingly, there must be eight non-connected bits accumulated in the event bit map, separated by a row or column from the event. In some embodiments of the present disclosure, the threshold th3 can be any other positive integers. For example, if the threshold th3 is five, the filtering criterion involves verifying whether any five of the eight non-connected bits shown in the filtering criterion 44c of FIG. 4 have been accumulated.

Based on the above, the triangle pattern event meets filtering criterion 44a, while the star pattern event does not meet any of the filtering criteria. Therefore, it is concluded that the triangle pattern event is a genuine event, while the star pattern event is a noise event. As depicted in the output event in FIG. 4, the triangle pattern event is retained, and the star pattern event is eliminated.

Figure 5:
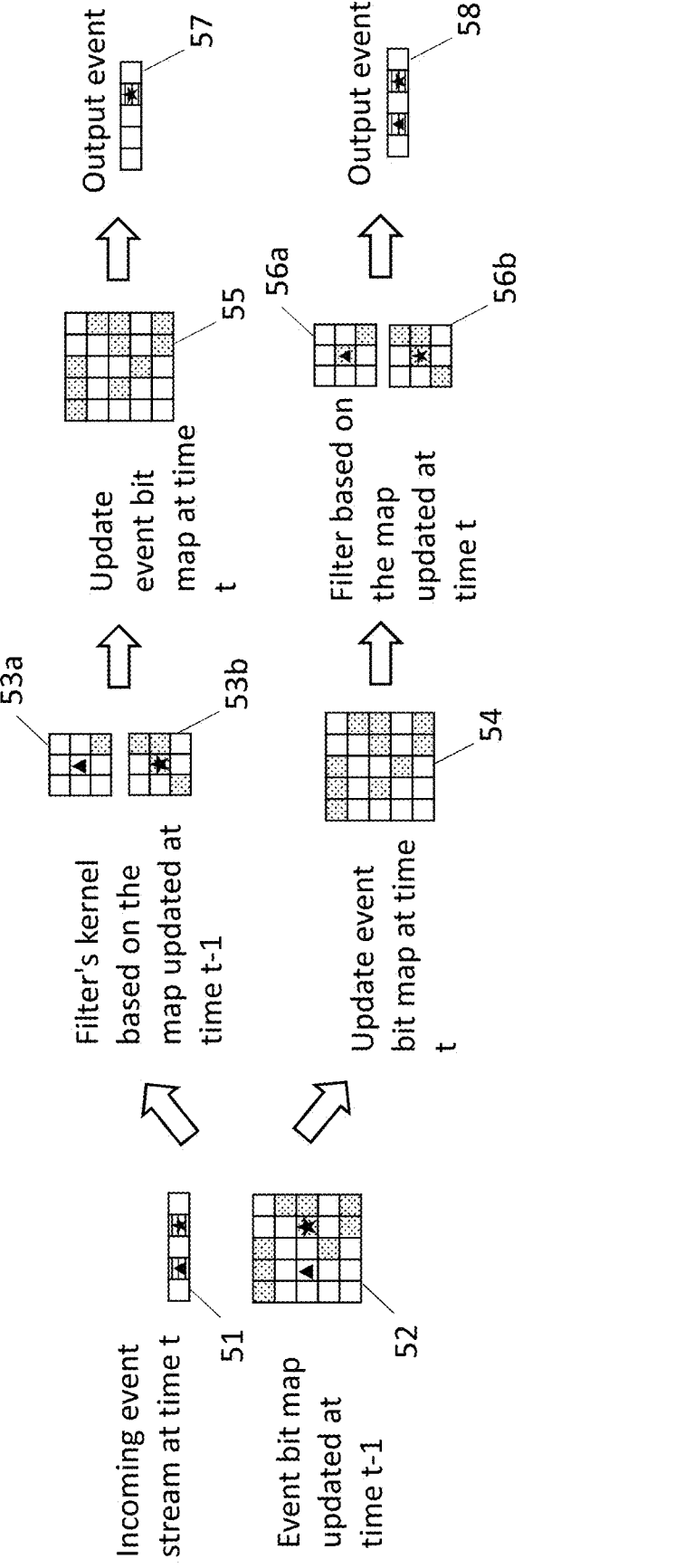
FIG. 5 illustrates a filtering process, in accordance with some embodiments of the present disclosure.

FIG. 5 illustrates a filtering process, in accordance with some embodiments of the present disclosure.

The filtering process can occur either before or after the accumulation process. For instance, FIG. 5 illustrates an incoming event stream 51 at time t and an event bit map 52 at time t−1. In certain embodiments, prior to filtering the event stream, a bitwise OR operation is conducted between the incoming event stream 51 and the event bits of the event bit map 52, based on a one-to-one correspondence, to update the event bits of the event bit map. If the filtering process occurs before the accumulation process, the event bit map 52 at time t−1 is utilized to filter the incoming event stream 51. The filter's kernels 53a and 53b display the 3×3 squares of the units in the event bit map 52 around the events represented by the triangle pattern and the star pattern, respectively. Using filtering methods similar to those described in FIG. 4, it is determined that the event represented by the triangle pattern is a noise event, while the event represented by the star pattern is a genuine event. Consequently, as shown in the output event 57 in FIG. 5, the event represented by the triangle pattern is eliminated, and the event represented by the star pattern is retained. The incoming event stream 51 is then accumulated to the event bit map 52 after filtering. The updated event bit map 55 at time t is depicted in FIG. 5.

If the filtering process occurs after the accumulation process, the event bit map 52 at time t−1 must accumulate the incoming event stream 51 before being used for filtering. The updated event bit map 54 at time t is depicted in FIG. 5. The filter's kernels 56a and 56b display the 3×3 squares of the units in the event bit map 54 around the events represented by the triangle pattern and the star pattern, respectively. Using filtering methods similar to those described in FIG. 4, it is determined that both the event represented by the triangle pattern and the event represented by the star pattern are genuine events. Consequently, as shown in the output event 58 in FIG. 5, both the event represented by the triangle pattern and the event represented by the star pattern are retained.

In certain embodiments of the present disclosure, accumulation can be carried out multiple times on the same group of data to gather and combine the results. Additionally, the map can be updated multiple times using the initial data and its variations, enabling the incorporation of new information and adjustments to the existing data. This iterative updating process ensures that the map remains current and accurate. Furthermore, the timing of the filtering operation is flexible. This flexibility enables efficient and effective data filtering.

Figure 6A:
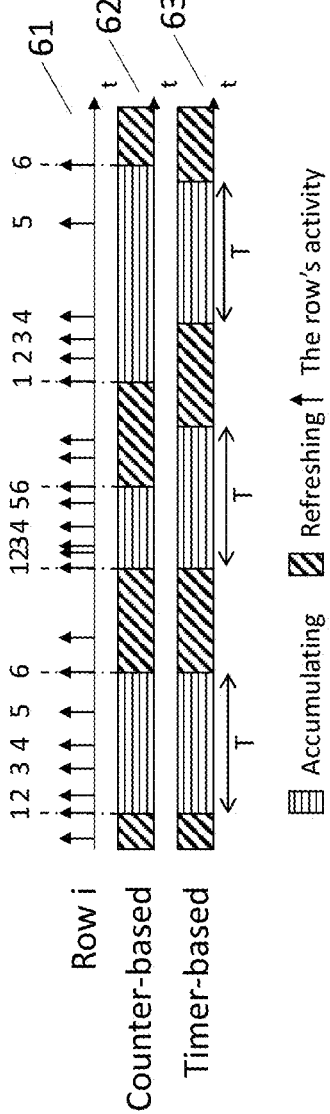
FIG. 6A illustrates how an accumulation period is determined, in accordance with some embodiments of the present disclosure.

FIG. 6A illustrates how an accumulation period is determined, in accordance with some embodiments of the present disclosure.

The accumulation period may be a parameter that is global or dependent on the row/column. It can be a fixed duration or the outcome of a function based on scanning counter/event activity. The accumulation period can be either based on a counter or a timer, and the counter-based function can have a global scope or be row/column specific.

In some embodiments of the present disclosure, the denoise processor 103 in FIG. 1 includes logic storing instructions that, when executed by the denoise processor, causes the image sensor to perform operations comprising: building the event bit map by performing a bitwise OR operation between each of a first set of events sensed by the pixel array and the event bits of the event bit map based on the one-to-one correspondence for a first period of time; after the event bit map is built, accumulating the event bit map by performing a bitwise OR operation between each of a second set of events sensed by the pixel array and the event bits of the event bit map based on the one-to-one correspondence for a second period of time; upon a first condition is met during accumulating the event bit map with the second set of events, refreshing the event bit map by overwriting the event bits of the event bit map with a third set of events based on the one-to-one correspondence for a third period of time; upon a second condition is met during refreshing the event bit map with the third set of events, accumulating the event bit map by performing a bitwise OR operation between each of a fourth set of events sensed by the pixel array and the event bits of the event bit map based on the one-to-one correspondence for a fourth period of time; and upon a third condition is met during accumulating the event bit map with the fourth set of events, refreshing the event bit map by overwriting the event bits of the event bit map with a fifth set of events based on the one-to-one correspondence for a fifth period of time.

In some embodiments of the present disclosure, the first condition relates to a count of row i being scanned reaches a predetermined threshold. The row is scanned whenever there is an event generated within it. In some embodiments of the present disclosure, the first condition relates to the second period of time reaches a predetermined threshold. In some embodiments of the present disclosure, the second condition relates to a count of row i being scanned reaches a predetermined threshold. The row i is scanned whenever there is an event generated within it. In some embodiments of the present disclosure, the second condition relates to the third period of time reaches a predetermined threshold. In some embodiments of the present disclosure, the second period of time is substantially identical to the fourth period of time. In some embodiments of the present disclosure, the third condition relates to a count of row i being scanned reaches a predetermined threshold. The row i is scanned whenever there is an event generated within it. In some embodiments of the present disclosure, the third condition relates to the fourth period of time reaches a predetermined threshold. In some embodiments of the present disclosure, the third period of time is substantially identical to the fifth period of time.

The time diagram 61 in FIG. 6A illustrates the activities when there is an event generated on a specific row (row i) in the pixel array. The pulses in the time diagram 61 represent the activities of the row i.

The time diagram 62 in FIG. 6A depicts a time sequence of accumulation (represented by the horizontal-line pattern) and refreshing (represented by the slash pattern). The accumulation period in the time diagram 62 is based on a counter. As indicated by the numbers above the pulses, each accumulation period ends when the counter reaches a predetermined threshold, six. In some embodiments of the present disclosure, the predetermined threshold may be any positive integers.

The time diagram 63 in FIG. 6A shows a time sequence of accumulation (represented by the horizontal-line pattern) and refreshing (represented by the slash pattern). The accumulation period in the time diagram 63 is based on a timer. As indicated by the predetermined period T below the time diagram 63, each accumulation period is equal to the predetermined period T.

Figure 6B:
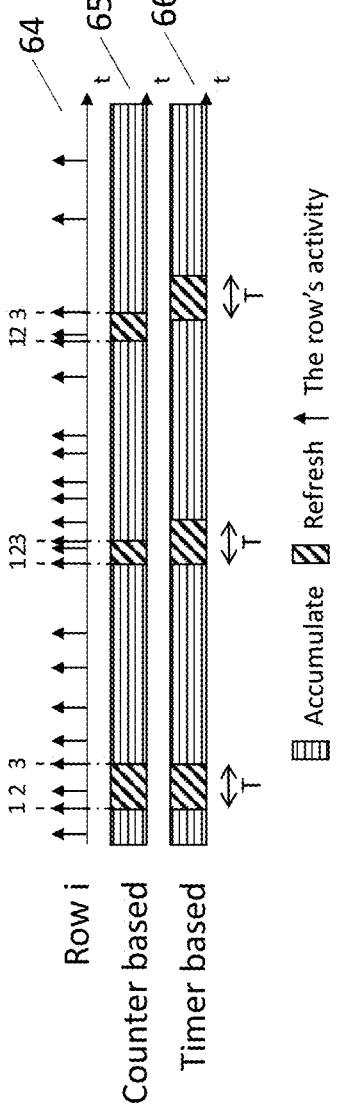
FIG. 6B illustrates how an accumulation period is determined, in accordance with some embodiments of the present disclosure.

FIG. 6B illustrates how an accumulation period is determined, in accordance with some embodiments of the present disclosure.

The refresh period can be either based on a counter or a timer, and the counter-based function can have a global scope or be row/column specific.

The time diagram 64 in FIG. 6B illustrates the activities when there is an event generated on a specific row (row i) in the pixel array. Pulses in the time diagram 64 represent the row's activities.

The time diagram 65 in FIG. 6B shows a time sequence of accumulating (represented by the horizontal-line pattern) and refreshing (represented by the slash pattern). The refresh period in the time diagram 65 is counter-based. Each refresh period ends as the counter counts to a predetermined threshold, 3, as indicated by the numbers over the pulses. In some embodiments of the present disclosure, the predetermined threshold may be any positive integers.

The time diagram 66 in FIG. 6B displays a time sequence of accumulating (represented by the horizontal-line pattern) and refreshing (represented by the slash pattern). The refresh period in the time diagram 66 is timer-based. Each refresh period is equal to the predetermined period T, as shown by the predetermined period T under the time diagram 66.

Figure 7:
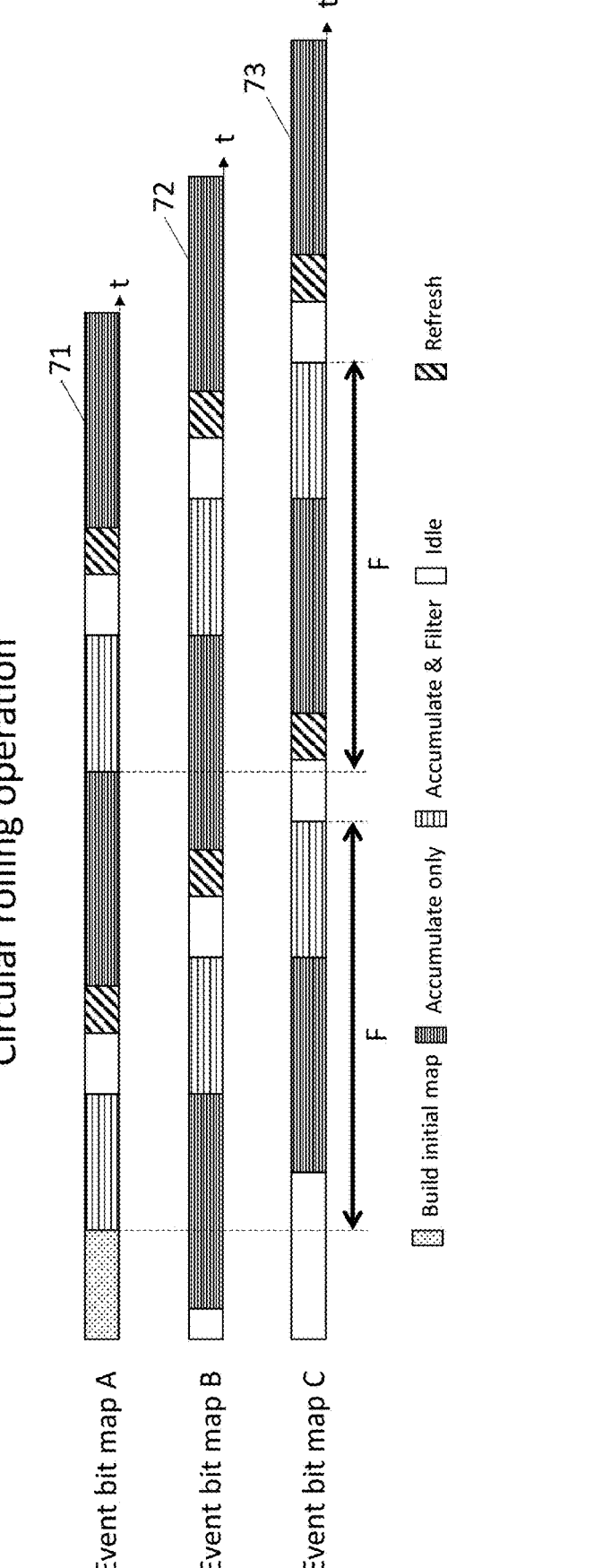
FIG. 7 illustrates a circular rolling operation of multiple event bit maps, in accordance with some embodiments of the present disclosure.

FIG. 7 illustrates a circular rolling operation of multiple event bit maps, in accordance with some embodiments of the present disclosure.

As depicted in FIG. 1, multiple denoise frame buffers 102a, 102b, and 102c can be utilized for the denoiser operation. Each of the denoise frame buffers 102a, 102b, and 102c can stores its own event bit map. It is possible to maintain several event bit maps at the same time. The switching between event bit maps may be based on either a timer or a counter. FIG. 7 demonstrates a circular rolling operation of multiple event bit maps. The time sequence 71 of event bit map A begins with the operation of building the initial map (represented by the dot pattern), then transitions into the operation of accumulating and filtering (represented by the sparse horizontal-line pattern). Subsequently, the time sequence 71 of event bit map A enters an idle state (represented by blank space) before the operation of refreshing (represented by the slash pattern). Following the refreshing, the time sequence 71 of event bit map A then switches into the operation of accumulating only (represented by the dense horizontal-line pattern), which is similar to the operation of building the initial map. Once the event bit map A is appropriately accumulated, the time sequence 71 transitions into the operation of accumulating and filtering (represented by the sparse horizontal-line pattern). Subsequently, the time sequence 71 of event bit map A enters an idle state (represented by blank space) before the operation of refreshing (represented by the slash pattern). The time sequences 72 and 73 of event bit maps B and C, respectively, perform similar operations to the time sequence 71 of event bit map A, but each with a time shift in comparison to the other two time sequences, which is referred to as "a circular rolling operation".

The circular rolling operation of multiple event bit maps offers the advantage that there is always an event bit map ready for filtering during the filtering period F, as shown in FIG. 7. During the first portion of the filtering period F, the time sequence 71 of event bit map A is accumulating and filtering, making it ready for use during this time. Similarly, during the second portion of the filtering period F, the time sequence 72 of event bit map B is accumulating and filtering, preparing it for use during this time. Finally, during the third portion of the filtering period F, the time sequence 73 of event bit map C is accumulating and filtering, making it ready for use during this time. Additionally, while one event bit map is being used for filtering, the other two event bit maps continue to accumulate events sensed by the pixel array, allowing for instant updating of the event bit map being used for filtering.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An image sensor, comprising:
a pixel array including a plurality of event-based sensor (EVS) pixels;
a denoise frame buffer configured to store an event bit map, wherein the event bit map includes an array of units, wherein the units have an one-to-one correspondence with the EVS pixels of the pixel array, wherein each unit stores an event bit; and
a denoise processor, wherein the denoise processor including logic storing instructions that, when executed by the denoise processor, causes the image sensor to perform operations comprising:
receiving a first set of events sensed by the pixel array;
inputting the first set of events to the event bit map, wherein a bitwise OR operation is performed between each of the first set of events and the event bits of the event bit map based on the one-to-one correspondence to update the event bits of the event bit map;
receiving a second set of events sensed by the pixel array;
inputting the second set of events to the event bit map, wherein a bitwise OR operation is performed between each of the second set of events and the event bits of the event bit map based on the one-to-one correspondence to update the event bits of the event bit map; and
filtering an event stream sensed by the pixel array based on the event bits of the event bit map to output an EVS data;
an event scanner configured to receive the filtered event stream from the denoise processor.

2. The image sensor according to claim 1, wherein the operations performed by the image sensor further comprising:
receiving a third set of events sensed by the pixel array; and
inputting the third set of events to the event bit map, wherein each of the third set of events overwrites the event bits of the event bit map based on the one-to-one correspondence to update the event bits of the event bit map.

3. The image sensor according to claim 1, wherein the event stream corresponds to a fourth set of events sensed by a row of the plurality of EVS pixels of the pixel array.

4. The image sensor according to claim 3, wherein filtering the event stream comprises:
determining locations on the event bit map that corresponds to each of the fourth set of events;

determining whether the event bits of the event bit map within a predetermined window around each of the locations meet a specific pattern of a first filtering criterion.

5. The image sensor according to claim 4, wherein filtering the event stream further comprises:
if the event bits of the event bit map within the predetermined window around one of the locations meet the specific pattern of the first filtering criterion, keeping the event of the fourth set of events corresponding to the location in the filtered event stream.

6. The image sensor according to claim 4, wherein filtering the event stream further comprises:
if the event bits of the event bit map within the predetermined window around one of the locations do not meet the specific pattern of the first filtering criterion, deleting the event of the fourth set of events corresponding to the location in the filtered event stream.

7. The image sensor according to claim 4, wherein filtering the event stream further comprises:
if the event bits of the event bit map within the predetermined window around each of the locations do not meet the specific pattern of the first filtering criterion, determining whether the event bits of the event bit map within the predetermined window around each of the locations meet a specific pattern of a second filtering criterion, wherein the specific pattern of the second filtering criterion are different from the specific pattern of the first filtering criterion.

8. The image sensor according to claim 7, wherein filtering the event stream further comprises:
if the event bits of the event bit map within the predetermined window around one of the locations meet the specific pattern of the second filtering criterion, keeping the event of the fourth set of events corresponding to the location in the filtered event stream.

9. The image sensor according to claim 7, wherein filtering the event stream further comprises:
if the event bits of the event bit map within the predetermined window around one of the locations do not meet the specific pattern of the second filtering criterion, deleting the event of the fourth set of events corresponding to the location in the filtered event stream.

10. The image sensor according to claim 3, wherein the operations performed by the image sensor further comprising:
before filtering the event stream, inputting the fourth set of events to the event bit map, wherein a bitwise OR operation is performed between each of the fourth set of events and the event bits of the event bit map based on the one-to-one correspondence to update the event bits of the event bit map.

11. An image sensor, comprising:
a pixel array including a plurality of event-based sensor (EVS) pixels;
a denoise frame buffer configured to store an event bit map, wherein the event bit map includes an array of units, wherein the units have an one-to-one correspondence with the EVS pixels of the pixel array, wherein each unit stores an event bit; and
a denoise processor, wherein the denoise processor including logic storing instructions that, when executed by the denoise processor, causes the image sensor to perform operations comprising:
building the event bit map by performing a bitwise OR operation between each of a first set of events sensed by the pixel array and the event bits of the event bit map based on the one-to-one correspondence for a first period of time;

after the event bit map is built, accumulating the event bit map by performing a bitwise OR operation between each of a second set of events sensed by the pixel array and the event bits of the event bit map based on the one-to-one correspondence for a second period of time;

upon a first condition is met during accumulating the event bit map with the second set of events, refreshing the event bit map by overwriting the event bits of the event bit map with a third set of events based on the one-to-one correspondence for a third period of time;

upon a second condition is met during refreshing the event bit map with the third set of events, accumulating the event bit map by performing a bitwise OR operation between each of a fourth set of events sensed by the pixel array and the event bits of the event bit map based on the one-to-one correspondence for a fourth period of time; and upon a third condition is met during accumulating the event bit map with the fourth set of events, refreshing the event bit map by overwriting the event bits of the event bit map with a fifth set of events based on the one-to-one correspondence for a fifth period of time.

12. The image sensor according to claim 11, wherein the first condition relates to a count of a row of the pixel array being scanned reaches a predetermined threshold, wherein the row is scanned whenever an event of the second set of events is generated within the row.

13. The image sensor according to claim 11, wherein the first condition relates to the second period of time reaches a predetermined threshold.

14. The image sensor according to claim 11, wherein the second condition relates to a count of a row of the pixel array being scanned reaches a predetermined threshold, wherein the row is scanned whenever an event of the second set of events is generated within the row.

15. The image sensor according to claim 11, wherein the second condition relates to the third period of time reaches a predetermined threshold.

16. The image sensor according to claim 13, wherein the second period of time is substantially identical to the fourth period of time.

17. The image sensor according to claim 14, wherein the third condition relates to a count of the row of the pixel array being scanned of the fourth set of events reaches the predetermined threshold, wherein the row is scanned whenever an event of the second set of events is generated within the row.

18. The image sensor according to claim 14, wherein the third condition relates to the fourth period of time reaches the predetermined threshold.

19. The image sensor according to claim 16, wherein the third period of time is substantially identical to the fifth period of time.

20. The image sensor according to claim 11, wherein the image sensor further performs: filtering an event stream sensed by the pixel array based on the event bits of the event bit map to output an EVS data in one or more of the second, the third, the fourth and the fifth time periods.

* * * * *